United States Patent [19]

Haight

[11] 4,276,157
[45] Jun. 30, 1981

[54] COMBINATION FEEDER AND SIFTER

[76] Inventor: Ehrick K. Haight, P.O. Box 326, Rowayton, Conn. 06853

[21] Appl. No.: 116,156

[22] Filed: Jan. 28, 1980

[51] Int. Cl.³ .............................................. B07B 1/28
[52] U.S. Cl. .................................... 209/246; 222/199
[58] Field of Search ............................. 209/243–246, 209/332, 240; 222/161, 199, 203

[56] References Cited

U.S. PATENT DOCUMENTS

| | | | |
|---|---|---|---|
| 2,095,283 | 10/1937 | Peal | 209/488 |
| 3,035,700 | 5/1962 | McCausland | 209/332 X |
| 3,278,090 | 10/1966 | Wahl | 222/199 |
| 3,399,771 | 9/1968 | Hryniowski | 209/245 |
| 3,476,245 | 11/1969 | Swallow | 209/332 X |
| 3,563,420 | 6/1969 | Ansley | 222/161 |
| 3,971,493 | 7/1976 | Williams | 222/199 X |

OTHER PUBLICATIONS

"Sweco Vibro-Energy Separators" (Copyright 1969, 1976).
"Sweco Bin-Evac Vibratory Bin Evacuators" (1971).

Primary Examiner—William A. Cuchlinski, Jr.
Attorney, Agent, or Firm—Mandeville and Schweitzer

[57] ABSTRACT

The disclosure relates to a combination feeder and sifter for particulate material. The apparatus includes a vertically elongated hopper for holding a bulk supply of the particulate material. A vibratory unit is positioned below the hopper and is movable independently thereof. An upper panel of the vibratory unit constitutes a bottom-forming panel of the hopper and is in direct contact with the bulk supply of particulate material. The bottom-forming panel has an adjustable feed rate device thereon which, when the vibratory mechanism is in operation, provides for a controlled rate of flow of particulate material from the hopper on to a vibrating sifting screen supported directly underneath the panel. The configuration and arrangement of the supply hopper and the bottom-forming panel are such that the mass of particulate material affecting the operation of the vibratory panel approximates that of an imaginary conical pile of the material. The apparatus permits a single vibratory drive unit to carry out both feeding and sifting operations simultaneously.

13 Claims, 3 Drawing Figures

COMBINATION FEEDER AND SIFTER

BACKGROUND AND SUMMARY OF THE INVENTION

In the commercial handling of particulate materials of all kinds, it is a common practice to pass the particulate material through one or more sifting screens, for a variety of purposes, such as removal of trash and oversize particles, particle size classification, elimination of fines, etc. Typically, for this purpose, vibratory sifting screen structures are provided, in which the material to be processed is deposited upon a screen of predetermined mesh, which is controllably agitated. Undersized particles, known as "unders," pass through the screen openings and are either discharged or further processed in a subsequent screen of finer mesh. Particles too large to pass through a screen ("overs") are discharged from above the level of the screen and are collected or discarded as the case may be.

Although it is possible to achieve the necessary vibratory motion for sifting by means of positive displacement, mechanical drive mechanism, many of the more advantageous and desired forms of commercial sifters utilize vibratory drive means which are non positive displacement in character. A particularly advantageous form of such vibratory drive is found, for example, on the so-called Sweco-type sifter. In these mechanisms, the screen structure is resiliently supported by means of a plurality of circumferentially spaced, vertically oriented springs. A vibratory drive unit for this sifter mechanism is provided by means of a vertically oriented electric motor mounting upper and lower eccentric weights. By adjusting the relative angular relationship of the upper and lower eccentric weights, a variety of desirable, controlled vibratory motions is obtainable, ranging from a straight radial progression of the particulate material from the center toward the periphery of the screen, as one extreme, to various degrees of spiral progression of the material from the center toward the periphery. At the opposite extreme, typically with the eccentrics displaced 90 degrees, the particulate material will progress spirally toward the center of the screen.

Conventionally, in a commercial sifting procedure, the particulate material is controllably fed to the sifting screen by an entirely separate means, which typically may be an independently controlled and operated vibratory feeder, or possibly even manual feeding procedures. Some commercially available vibratory feeders of particulate material even utilize essentially the identical vibratory drive mechanism used in the Sweco-type sifter described above.

Notwithstanding that both sifting and feeding procedures typically involve vibratory drive mechanisms, conventional wisdom of the past has been that separate and independent apparatuses are required for feeding and sifting of particulate material. The apparent reasoning behind such conventional wisdom has been that, with non positive displacement vibratory drive means, the physical loading of the sifter screen has a consequential effect upon vibratory motion. In other words, according to conventional wisdom, a spring supported, eccentric driven sifting device, if too heavily loaded with the weight of a supply of particulate material, will have an ineffectual motion. Thus, in conventional installations, the sifting apparatus is driven independently by its own nonpositive displacement vibratory drive, and a separate apparatus is provided for delivering particulate material at reasonably controlled rates to the surface of the screen. Although the feeder itself may be subject to substantial variations in the amount of material on it at any one time, the screening mechanism tends to be isolated, at least from the effects of overloading.

In accordance with the present invention, a more complete understanding of the characteristics of particulate materials has enabled a bulk supply feeder and sifter screen to be combined for the first time in a single combination apparatus, driven by a single, common nonpositive displacement vibratory drive unit. The structure of the invention is particularly ideally suited for operation by a Sweco-type vibratory drive unit utilizing upper and lower, angularly displaced eccentric weights in conjunction with a spring supported vibratory unit.

A basic concept of the invention derives from an advantageous utilization of the principle that a particulate material, when heaped in a pile, will assume a given angle of repose (measured with respect to the horizontal). Thus, depending upon the characteristics of the particulate material, it will assume a pile of conical form. After the cone reaches a predetermined height and angle, additional material piled on top of the cone will merely slide down to the bottom. Accordingly, when particulate material is confined in a vertically elongated supply hopper, the weight "seen" by the bottom of the hopper is not necessarily the entire weight of the particulate material contained by the hopper but approximates or at least bears a relationship to the weight of a conical mound of the material whose base angle approximates the angle of repose of that material. Additional material piled into the hopper, above the imaginary conical pile, tends to slide down the sides of such imaginary conical pile, and the weight thereof is supported largely by the sidewalls of the hopper.

The apparatus of the invention takes advantage of the above described phenomenon by providing for a single vibratory unit, located directly below a supply hopper holding a bulk supply of particulate material, and providing on the vibratory unit a bottom-forming panel which is separate from but effectively constitutes the bottom of the bulk supply hopper. In the vertically elongated hopper, the bottom-forming panel is affected largely only by the weight of the imaginary conical pile of material, regardless of the height of the stored bulk material in the hopper. Accordingly, the resilient support and the eccentric drive system for the vibratory unit may be designed in the first instance to enable the desired, controlled vibratory motion to be achieved, and efficient sifting to be accomplished notwithstanding a heavy load of particulate material contained in the hopper above the vibratory unit.

In accordance with the invention, the bottom-forming panel for the supply hopper, which is actually carried by the vibratory unit mounted below and independent of the hopper, has a central discharge opening and an adjustable feed limiting device associated therewith. Accordingly, when the apparatus is in normal operation, the particulate material for the supply hopper is admitted through the discharge opening at a predetermined, limited rate, and is deposited centrally on the vibratory sifting screen. From that point, the particulate material is processed in a manner similar to conventional screening procedures.

The apparatus of the invention is unique in providing for both feeding and sifting in a single, unitary apparatus with a common, nonpositive displacement vibratory drive unit. Significant savings are realized not only in capital equipment costs, but in plant space as well. Additional, although perhaps less significant savings are realized in terms of lower operating and maintenance costs. Handling of hazardous and/or toxic materials is also simplified because of the elimination of additional handling.

For a complete understanding of the above and other features and advantages of the invention, reference should be made to the following detailed description of a preferred embodiment of the invention, and to the accompanying drawings.

DESCRIPTION OF PREFERRED EMBODIMENTS

Figure 1:
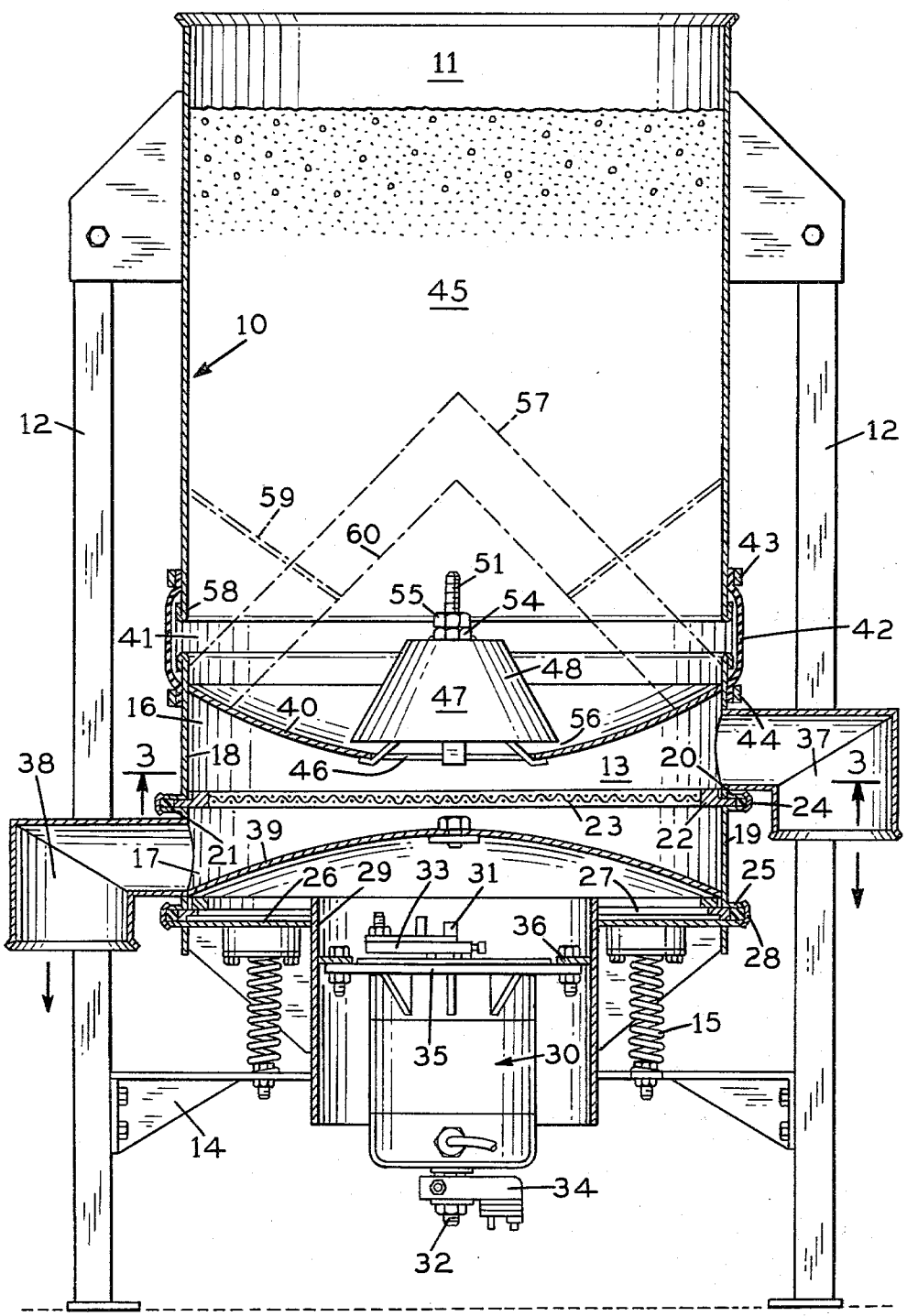
FIG. 1 is a vertical cross sectional view of a combined hopper, feeder and sifter unit for particulate material, incorporating the various features of the invention.
Figure 2:
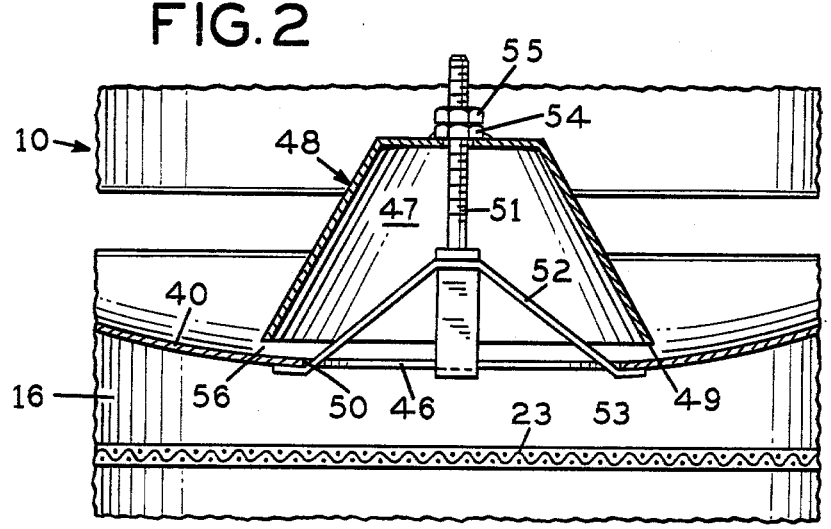
FIG. 2 is an enlarged cross sectional view illustrating a feed limiting device incorporated in the apparatus of FIG. 1.
Figure 3:
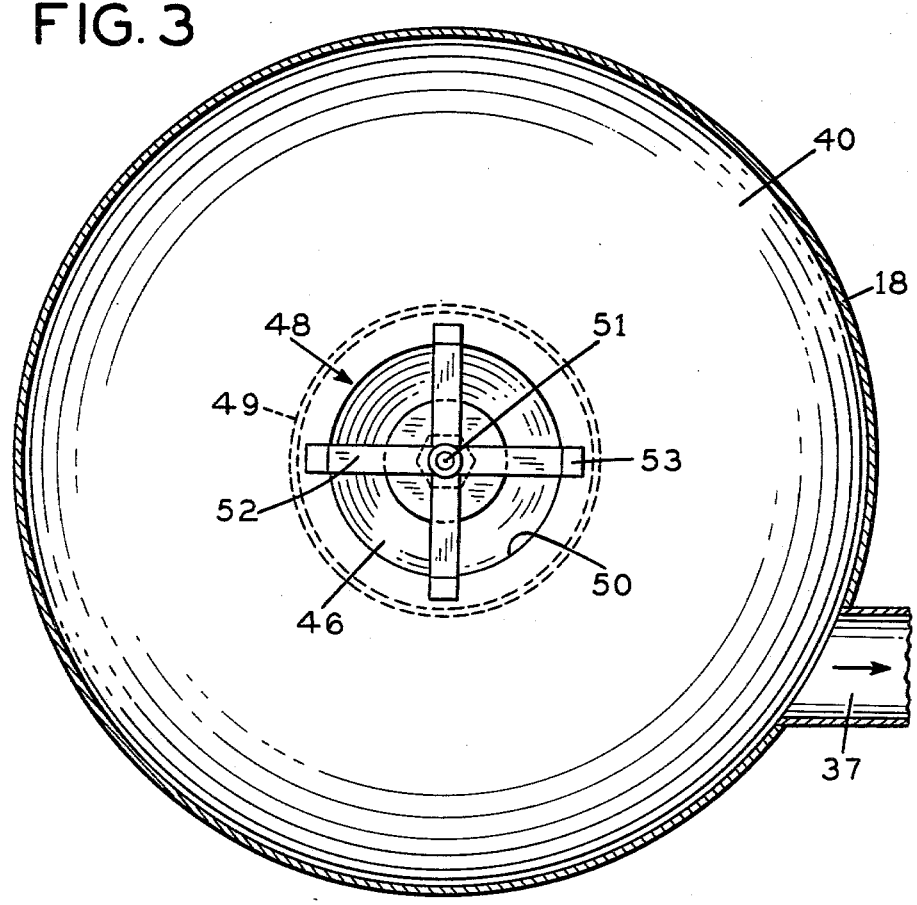
FIG. 3 is a cross-sectional view as taken generally on line 3—3 of FIG. 1.

Referring now to the drawings, and initially to FIGS. 1-3 thereof, the reference numeral 10 designates the sidewall structure of a vertically elongated supply hopper 11. The hopper 11 is supported in a generally vertical orientation by means of a plurality of vertical supports 12. In the first illustrated form of the invention, the hopper 11 is cylindrical in form and open at the top and bottom.

Directly below the open lower end of the hopper is a vibratory bottom structure, designated generally by the reference numeral 13. This bottom structure is mounted to the vertical supports 12 by means of a support bracket 14 mounting a plurality of circumferentially spaced, vertically oriented coil springs 15. In general, the construction as thus far described is consistent with the disclosure of the Ansley U.S. Pat. No. 3,563,420.

As illustrated particularly in FIG. 1, the bottom structure 13 includes a pair of stacked ring sections 16, 17, having cylindrical sidewalls 18, 19, typically of a diameter corresponding to that of the hopper sidewall 10. The upper and lower ring sections 16, 17 have oppositely facing annular flanges 20, 21, which clamp between them the annular frame 22 of a sifting screen 23. A circumferentially tensioned band 24 tightly engages the flanges 20, 21, rigidly securing the ring sections 16, 17 to each other and tightly clamping the screen frame 22 in position. At the bottom of the lower ring unit 17, a lower flange 25 opposes a flat, annular mounting plate 26, being separated therefrom by a spacer ring 27 and tightly clamped in the assembled relation by a tensioned circumferential band 28. The annular plate 26 mounts in its center portion a vertically disposed cylindrical housing 29, within which is mounted an electric motor 30 having upwardly and downwardly projecting motor shaft portions 31, 32 mounting adjustable eccentric weights 33, 34 respectively. The motor 30 is rigidly secured to the housing 29 by means of an annular flange 35 bolted to flange brackets 36 projecting inwardly from the housing wall. The drive motor 30 is thus rigidly associated with the bottom structure 13.

The annular mounting plate 26 engages and is supported by the upper ends of the coil springs 15, of which there typically may be ten or twelve or more in number, depending upon the size and intended application of the unit. In accordance with the descriptions of the before mentioned Ansley patent, operation of the motor 30 imparts a vibratory action to the bottom structure 13, which includes a predominantly horizontal component imparted by the upper eccentric 33 and a predominantly vertical component imparted by the lower eccentric 34.

Above the screen 23, there is a first discharge outlet 37 leading from the periphery of the upper ring section 16, and a second discharge outlet 38 leads from the periphery of the second ring section 17, below the screen. In operation, in accordance with known principles, when particulate material is placed on the screen and the vibratory drive unit is energized, the particulate material is vibrated progressively and a typically spiral pattern toward the outside wall 18 of the upper ring section. When the equipment is in proper adjustment, the small particles (unders) will have passed through the screen 23, by the time the material reaches the outside wall 18, and the retained, larger particles (overs) progress around the sidewall 18 and are discharged through the upper opening 27. The bottom ring section 17 is provided with an upwardly convex bottom wall 39, which encourages the rapid outward progression of the smaller particles toward the outside wall 19 and out through the discharge opening 38.

The sidewall 18 of the upper ring section 16, although aligned with and generally forming a continuation of the cylindrical hopper wall 10, is separated therefrom by a small space 41, sufficient to accommodate the maximum of vibratory excursion of the bottom structure relative to the supply hopper 11. The space 41 is bridged by an annular band 42 of suitable elastomeric material. The upper and lower edges of the band 42 are clamped tightly to the cylindrical walls 10, 18, by means of circumferential clamping bands 43, 44. In accordance with an important aspect of the invention, the upper ring section 16 is provided with a panel 40, secured adjacent the upper edges of the outer wall 18. The described arrangement is such that the panel 40 becomes, in effect, the bottom wall of the hopper 11. In normal operation, the panel 40 which may be referred to as the bottom-forming panel, is in direct contact with the bulk supply of particulate material 45.

To particular advantage, the bottom-forming panel 40 is of an upwardly concave configuration and is provided with a discharge opening 46 in its central region. In conjunction with the central discharge opening 46, there is provided an adjustable feed rate mechanism, generally designated by the numeral 47, for controlling and limiting the rate at which particulate material flows through the discharge opening 46 and down onto the center portion of the underlying sifting screen 23.

An advantageous form of feed rate limiting mechanism is shown in FIG. 2, and this comprises a frusto-conical cap 48, formed of sheet metal, more or less in the form of an inverted cup. The base diameter of the cap 48 is somewhat greater than the size of the central opening 46, so that the lower edges 49 of the cap overlie the upper surface of the bottom-forming panel 40, radially outward of the edges 50 of the central opening. The cap 48 is mounted at an adjustable height above the bottom panel 40, by means of a threaded stud 51, which is supported above the discharge opening 26 by a plurality of metal supports 52 welded or otherwise secured to the bottom-forming panel 40 at spaced points 53. A threaded nut 54 is welded to the upper wall of the cap 48 and is received on the stud 51 to enable the cap to be adjusted vertically by rotation in one direction or the other. A lock nut 55 serves to secure the cap in any preadjusted position. Typically, the equipment is set up for the processing of a given material over a relatively long period of time. In such cases, the cap 48 is initially adjusted to provide an optimum width of clearance gap 56, after which little or no further adjustment is normally required.

In the operation of the equipment of the invention, the hopper 11 is initially filled with particulate material to be processed. As reflected in FIG. 1, the relative height and diameter of the hopper 11 is such that the hopper can be and typically is filled to a height above the top of the imaginary cone 57 of material, which is determined by the angle of repose of that specific material. According to my observations, the vibratory bottom structure 13 is not directly affected by the entire column of particulate material 45. Rather, the mass material "seen" by the bottom structure bears a reasonable relationship to the mass of the imaginary cone of material 57. Accordingly, the coil springs 15, motor 30 and eccentric weights 33, 34 may all be designed and/or adjusted to achieve a desired vibratory motion, assuming that the weight of material supported on the bottom-forming panel 40 is a more or less constant weight, being a reasonable approximation of the weight of the imaginary cone of material. In actual operation, notwithstanding that the hopper is filled far above the top of the imaginary conical pile, the operation and behavior of the vibratory bottom section 13 is substantially as if only the imaginary conical pile were supported on the bottom-forming panel 40. Experience has indicated that there is little effective change in the vibratory motion of the bottom unit 13 with variations in the height of the supply of particulate material above the imaginary cone 57. Accordingly, particulate material may be added to and processed from the hopper 11 without rendering inoperative or otherwise adversely affecting the efficiency of the nonpositive displacement vibratory drive unit.

In operation, the vibratory motion of the bottom section 13 is imparted up into the body of particulate material, fluidizing the lower portions of the material sufficiently to induce a gravity flow toward the bottom of the concave panel 40. The material is permitted to flow through the adjustable feed gap 56 at a predetermined rate and is deposited onto the surface of the sifting screen 23. The feed rate on to the screen can be optimized for maximum throughput without overloading of the screen, as will be readily understood. The normal orbital vibrational motion of the bottom section 13, as outlined in the before mentioned Ansley patent, serves to achieve an outwardly progressing spiral movement of the particulate material in a known manner, with the overs discharged through outlet 37 and the unders discharged through the bottom outlet 38.

The apparatus of the present invention contravenes conventional knowledge and wisdom with respect to the feeding and operation of gyratory sifters of a nonpositive displacement type. In all instances of which the applicant is aware, nonpositive displacement type gyratory sifters are provided with separate, independent feed arrangements, so that the bulk supply of particulate material to be processed does not adversely affect the performance of the sifter. In accordance with this invention, however, the sifter drive can also be utilized for controlled infeeding of the particulate material from a variable bulk supply, by locating a vertically elongated supply hopper directly above the vibrating screen mechanism, and mounting on the latter mechanism a bottom-forming panel which is independent of the hopper and movable with the gyratory screen. By providing the bottom-forming panel with an upwardly concave contour, the fluidized particulate material above the bottom-forming panel is caused to flow toward the center of the panel, even though the gyratory action of the unit will cause a radially outward progression of the material on the flat screen below. The particulate material from the bulk supply of the hopper progresses radially inward, through the feed gap 56 formed by the adjustable feeder cap 48 and is deposited in the center of the screen 23 in a highly optimized manner. Both feeding and sifting is accomplished in a single apparatus, with a single drive unit, at significant savings in both capital cost and plant floor space, and other obvious savings in maintenance and operating costs.

Although various feed rate controlling devices may be employed, the illustrated device is particularly effective with respect to its treatment of trash and oversize particles. Because of the strong vibrational action of the bottom structure 13 as a whole, there is limited vibrational motion between the bottom-forming panel 40 and the frusto-conical cap 48. Accordingly, trash and other oversize particles tending to flow radially inward toward the discharge opening 46 will reach and be retained by the relatively sharp outer lower edge of the conical cap 48. Over a period of time, the constant vibratory action of the cap 48 relative to the bottom-forming panel chews and abrades at the retained particles, and many of them are ultimately reduced to a size capable of passing through the feed gap 56, after which they are discharged through the overs outlet 37.

In the illustrated form of the invention, the walls 10 of the supply hopper 11 are of constant diameter and equal in diameter to that of the vibratory bottom section 13. However, this is not required by the invention. In general, the lower or outlet end 58 of the hopper wall should not be significantly larger in diameter than the diameter of the bottom-forming panel 40, so as not to excessively broaden the diameter of the base of the conical pile 57. However, as long as the particulate material has adequate flow properties, the walls of the hopper 11 may diverge or be enlarged in diameter above the bottom extremities 58. Further, where the particulate material is unusually dense in character, but sufficiently free flowing, the lower end extremity of the hopper wall may be necked in to a smaller diameter than that of the bottom-forming panel 40. In such cases, the base diameter of the imaginary conical pile 57 may actually be somewhat less than the diameter of the bottom-forming panel. A similar result might be achieved by incorporating an annular shoulder 59 in the lower portion of the supply hopper, having a reduced central opening providing for a reduction in the base diameter of the imaginary conical pile of particulate material. In all cases, pursuant to the invention, the vertically elongated proportions of the hopper will be such that typical and normal operations will contemplate the possibility if not the likelihood, of loading the supply hopper to a level well above the top of the imaginary cone.

In any of its various forms, the apparatus of the invention provides for the unique advantage of combining controlled feeding from a bulk supply and gyratory sifting in a single apparatus, driven by a single nonpositive displacement vibratory drive unit, with resulting savings and convenience.

It should be understood, of course, that the specific forms of the invention herein illustrated and described are intended to be representative only, as certain changes may be made therein without departing from the clear techings of the disclosure. Accordingly, reference should be made to the following appended claims in determining the full scope of the invention.

I claim:

1. A combined vibratory feeder and sifter, which comprises
   (a) a vertically elongated supply hopper for retaining a variable, bulk supply of particulate material to be screened,
   (b) said hopper having a generally open bottom structure,
   (c) support means for supporting said supply hopper in generally fixed relation,
   (d) a vibratory bottom structure positioned directly below and associated with said supply hopper,
   (e) resilient support means for said bottom structure accommodating vibratory motion thereof relative to said supply hopper,
   (f) a generally horizontal bottom-forming panel in said bottom structure effectively forming a bottom wall of said supply hopper and operative to directly support the particulate material stored in said hopper,
   (g) connecting means joining the open lower end of said generally fixed supply hopper with said bottom-forming panel while accommodating vibratory motion of said bottom-forming panel relative to said supply hopper,
   (h) said bottom-forming panel having a discharge opening therein,
   (i) an adjustable feed rate limiting means associated with said discharge opening and operative to control the rate of flow of particulate material therethrough in response to vibratory movement of said bottom structure,
   (j) said vibratory bottom structure further including a sifting screen mounted in said bottom structure directly beneath said bottom-forming panel and in position to receive particulate material passing through said discharge opening,
   (k) discharge outlets for said particulate material located above and below said sifting screen, and
   (l) a common vibratory drive means for said bottom structure for imparting controlled vibratory motion simultaneously to said bottom-forming panel and said sifting screen.

2. A combined feeder and sifter according to claim 1, further characterized by
   (a) said bottom-forming panel and said sifting screen being rigidly joined and surrounded by a side wall,
   (b) said connecting means comprising a flexible, resilient element connecting said side wall with the walls of said supply hopper.

3. A combined feeder and sifter according to claim 1, further characterized by said vibratory drive means comprising
   (a) motor shaft rotatable about a generally vertical axis and having upper and lower end portions, and
   (b) first and second eccentric weight means carried by the upper and lower end portions respectively of said motor shaft.

4. A combined feeder and sifter according to claim 1, further characterized by said bottom structure comprising
   (a) a side wall panel generally conforming to and constituting a continuation of the lower side wall region of said supply hopper,
   (b) said bottom-forming panel being secured to said side wall panel near its upper edge area,
   (c) a lower wall panel secured to said side wall panel below said bottom-forming panel and constituting the bottom wall of said bottom structure, and
   (d) said sifting screen being mounted to said side wall panel between said bottom-forming panel and said lower wall panel.

5. A combined feeder and sifter according to claim 4, further characterized by said adjustable feed rate limiting means comprising
   (a) a generally conical cap member positioned adjacent said discharge opening and extending upward into said supply hopper,
   (b) and means supporting said cap member in normally fixed but adjustable relation to said discharge opening whereby to define an annular opening of predetermined dimensions.

6. A combined feeder and sifter according to claim 5, further characterized by
   (a) said bottom-forming panel being upwardly concave and said discharge opening being in the center area thereof.

7. A combination vibratory feeder and sifter, which comprises
   (a) a generally fixed supply hopper for retaining a variable bulk supply of particulate material to be screened,
   (b) a vibratory screen structure positioned directly below said hopper and including a sifting screen, and
   (c) vibratory drive means for said screen structure,
   (d) vibratory feeder means, forming part of said screen structure, being positioned above said sifting screen and being in direct, load supporting contact with said particulate material over a predetermined area,
   (e) said hopper having sidewalls of sufficient height to accommodate the retention of a bulk supply of particulate material at a level, above said vibratory feeder means, substantially above the height of an imaginary conical pile of such material whose base corresponds generally to said predetermined area.

8. A combination vibratory feeder and sifter according to claim 7, further characterized by
   (a) said vibratory drive means comprising a nonpositive displacement means.

9. A combination vibratory feeder and sifter according to claim 8, further characterized by
   (a) said vibratory feeder means including a bottom-forming panel positioned directly below but separate from the lower end of said hopper, and
   (b) said hopper lower end having a discharge area not substantially greater in area than said bottom-forming panel.

10. A combination vibratory feeder and sifter according to claim 9, further characterized by (a) said vibratory drive unit being adjustable to provide for inside-to-outside flow of particulate matter deposited in the center areas of said screen, (b) said bottom-forming panel having an upwardly concave contour, whereby particulate material, fluidized by vibratory action of said drive unit tends to flow in an outside-to-inside direction, and (c) said bottom-forming panel having a central discharge opening for depositing by gravity particulate material on the center areas of said sifting screen.

11. A combination vibratory feeder and sifter according to claim 10, further characterized by (a) said vibratory feeder means comprising a cap member mounted above the central discharge opening in said bottom-forming panel and having lower sidewall edges positioned in spaced, opposed relation to the upper surface of said bottom-forming panel in regions surrounding and spaced radially outward of the edges of said central discharge opening to form an annular feed gap, and (b) means for vertically adjusting said cap to vary the height of said feed gap.

12. A combination vibratory feeder and sifter according to claim 11, further characterized by (a) means for mounting said cap member on said bottom-forming panel in a manner providing for limited relative vibratory motion between said panel and said cap member.

13. A combination vibratory feeder and sifter according to claim 12, further characterized by (a) said cap member being in the form of a hollow, frusto-conical member.

* * * * *